United States Patent
Zhu et al.

(10) Patent No.: US 12,517,900 B2
(45) Date of Patent: Jan. 6, 2026

(54) DATA QUERY METHODS AND APPARATUSES AND DATABASE SYSTEMS

(71) Applicant: Alipay (Hangzhou) Information Technology Co., Ltd., Zhejiang (CN)

(72) Inventors: Bingpeng Zhu, Hangzhou (CN); Jie Song, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/655,931

(22) Filed: May 6, 2024

(65) Prior Publication Data

US 2024/0370430 A1    Nov. 7, 2024

(30) Foreign Application Priority Data

May 6, 2023  (CN) .......................... 202310519769.3

(51) Int. Cl.
  *G06F 16/2453*   (2019.01)
  *G06F 16/22*     (2019.01)
(52) U.S. Cl.
  CPC .... *G06F 16/24532* (2019.01); *G06F 16/2246* (2019.01)
(58) Field of Classification Search
  CPC ......... G06F 16/24532; G06F 16/24553; G06F 16/248; G06F 16/2246; G06F 16/00; Y02D 10/00
  See application file for complete search history.

(56) References Cited

U.S. PATENT DOCUMENTS

| | | | |
|---|---|---|---|
| 11,061,828 B1 * | 7/2021 | Peterson | G06F 12/0875 |
| 11,436,159 B2 * | 9/2022 | Peterson | G06F 12/1081 |
| 11,586,385 B1 * | 2/2023 | Lercari | G06F 12/0246 |
| 11,630,832 B2 * | 4/2023 | Choi | G06F 16/254 |
| | | | 707/602 |
| 12,072,913 B1 * | 8/2024 | James | G06F 16/285 |
| 2021/0311997 A1 * | 10/2021 | Grocutt | G06F 16/90348 |
| 2022/0156260 A1 * | 5/2022 | Edara | G06F 16/2237 |

FOREIGN PATENT DOCUMENTS

| | | | | |
|---|---|---|---|---|
| CN | 113407550 | | 9/2021 | |
| CN | 114328545 | * | 4/2022 | ......... G06F 16/2455 |
| CN | 117785890 | | 3/2024 | |

* cited by examiner

*Primary Examiner* — Huawen A Peng
(74) *Attorney, Agent, or Firm* — Fish & Richardson P.C.

(57) ABSTRACT

A computer-implemented method for querying data, includes performing a data query in a memory table in response to receiving a data query request initiated by a user. At least one master data block asynchronous input/output (IO) query for a hierarchical storage layer is initiated in parallel to a database system in response to that a data query result for the memory table does not satisfy a data query condition in the data query request. After receiving a query response to all master data block asynchronous IO queries, data analysis is performed on a master data block obtained through a query. A query result is determined for the data query request based on the data query result for the memory table or a data analysis result of the master data block. The data query result for the data query request is provided to the user.

20 Claims, 10 Drawing Sheets

| Key | Value_1 | Value_2 | ... | Value_5 |
|---|---|---|---|---|
| ID 1 | Tom | 19 | ... | Student |
| ID 2 | Jerry | 35 | ... | Teacher |
| ... | ... | ... | ... | ... |

DATA QUERY METHODS AND APPARATUSES AND DATABASE SYSTEMS

CROSS-REFERENCE TO RELATED APPLICATIONS

This application claims priority to Chinese Patent Application No. 202310519769.3, filed on May 6, 2023, which is hereby incorporated by reference in its entirety.

TECHNICAL FIELD

Embodiments of this specification generally relate to the data storage field, and in particular, to data query methods and apparatuses and database systems applicable to large-value data storage.

BACKGROUND

In a conventional data storage mechanism, a database system processes to-be-stored data into key-value (KV) data, and stores the KV data at a memory layer or in a data storage medium in the database system. To improve data writing performance, the database system performs data organization on the to-be-stored data in a hierarchical organization manner. For example, an LSM-tree-like structure is used, the to-be-stored data on which data organization is performed are classified into different data storage files, and different data storage files are stored at the memory layer or different hierarchical storage layers of the data storage medium. For example, the database system calculates a hash value of a key of the to-be-stored data, classifies a value corresponding to the key into different common hash value ranges based on the calculated hash value, and then classifies the to-be-stored data into different data storage files based on the hash ranges. When a data query is performed, the data query is performed layer by layer starting from the memory layer of the database system.

SUMMARY

Embodiments of this specification provide a data query solution for a key-value database system. In the data query solution, the database system includes a memory layer and a data storage medium layer including at least one hierarchical storage layer. When a data query for the hierarchical storage layer is performed, a parallel asynchronous IO query is performed for a plurality of hierarchical queries of a same key, to effectively reduce a data query delay, and improve data query performance.

According to an aspect of embodiments of this specification, a data query method for a database system is provided. The database system includes a memory layer and a nonvolatile data storage medium layer, the data storage medium layer includes at least one hierarchical storage layer, data are sequentially stored in a memory table at the memory layer and a data storage file at the at least one hierarchical storage layer, data in the data storage file are stored as at least one master data block, and the data query method includes: performing a data query in the memory table in response to receiving a data query request initiated by a user; initiating in parallel at least one master data block asynchronous IO query for the hierarchical storage layer to the database system in response to that a data query result for the memory table does not satisfy a data query condition in the data query request; after receiving a query response to all master data block asynchronous IO queries, performing data analysis on a master data block obtained through a query; and determining a data query result for the data query request based on the data query result for the memory table and/or a data analysis result of the master data block, and providing the data query result for the data query request for the user.

Optionally, in an example of the aspect, the master data block includes metadata used to record storage location information of a corresponding additional data block in the data storage file; after the performing data analysis on a master data block obtained through a query, the data query method further includes: initiating in parallel an additional data block asynchronous IO query for a to-be-queried additional data block to the database system in response to that the data analysis result of the master data block indicates that an additional data block needs to be queried; and after receiving a query response to all additional data block query requests, performing data analysis on an additional data block obtained through a query. The determining a data query result for the data query request based on the data query result for the memory table and/or a data analysis result of the master data block, and providing the data query result for the data query request for the user includes: determining the data query result for the data query request based on the data query result for the memory table, the data analysis result of the master data block, and/or a data analysis result of the additional data block, and providing the data query result for the data query request for the user.

Optionally, in an example of the aspect, to-be-stored data can be stored in the database system in the following data storage method: writing to-be-stored data into the memory table; and in response to that the memory table is fully written, performing data writing on stored data in the memory table layer by layer in the following manner starting from a top hierarchical storage layer, until lower-layer data writing is not triggered: reading all stored data in a data storage file at a current hierarchical storage layer; combining written upper-layer stored data with the read stored data; dividing a value corresponding to each key in combined stored data into at least one master data block; determining, based on a common hash value and a perfect hash value of a key corresponding to each master data block, a data storage file in which each master data block is located and an offset of each master data block in the data storage file in which each master data block is located, where each data storage file corresponds to a common hash value range; and performing data writing on each master data block based on the determined data storage file in which each master data block is located and the offset of each master data block in the data storage file in which each master data block is located.

Optionally, in an example of the aspect, the dividing a value corresponding to each key in combined stored data into at least one master data block can include: dividing the value corresponding to each key in the combined stored data into the at least one master data block and a corresponding additional data block. The performing data writing on each master data block based on the determined data storage file in which each master data block is located and the offset of each master data block in the data storage file in which each master data block is located can include: performing data writing on each master data block and a corresponding additional data block based on the determined data storage file in which the master data block is located and the offset of the master data block in the data storage file in which the master data block is located, where a written master data block includes metadata, and the metadata are used to record storage location information of each additional data block of the master data block in the data storage file.

Optionally, in an example of the aspect, the initiating in parallel at least one master data block asynchronous IO query for the hierarchical storage layer to the database system in response to that a data query result for the memory table does not satisfy a data query condition in the data query request can include: for each hierarchical storage layer, locating a data storage file at the hierarchical storage layer based on a common hash value of a key of to-be-queried data, and locating storage location information of a master data block in the data storage file based on a perfect hash value of the key; for each to-be-queried master data block, generating a corresponding master data block asynchronous IO query request based on the storage location information of the master data block in the data storage file at the corresponding hierarchical storage layer; and sending in parallel all generated master data block asynchronous IO query requests to the database system.

Optionally, in an example of the aspect, the initiating in parallel an additional data block asynchronous IO query for a to-be-queried additional data block to the database system in response to that the data analysis result of the master data block indicates that an additional data block needs to be queried can includes: for each to-be-queried additional data block, obtaining storage location information that is of an additional data block in the data storage file and that is recorded in metadata in a corresponding master data block; generating a corresponding additional data block asynchronous IO query request based on the obtained storage location information of the additional data block in the data storage file; and sending in parallel all generated additional data block asynchronous IO query requests to the database system.

Optionally, in an example of the aspect, an indication indicating that the additional data block needs to be queried can be determined based on metadata in an analyzed master data block and the data query condition.

Optionally, in an example of the aspect, the determining a data query result based on the data query result for the memory table and/or a data analysis result of the master data block can include: backfilling the data query result for the memory table and/or the data analysis result of the master data block into the data query result based on the data query condition.

According to another aspect of the embodiments of this specification, a data query apparatus applied to a database system is provided. The database system includes a memory layer and a data storage medium layer, the data storage medium layer includes at least one hierarchical storage layer, data are sequentially stored in a memory table at the memory layer and a data storage file at the at least one hierarchical storage layer, data in the data storage file are stored as at least one master data block, and the data query apparatus includes: a memory query unit, configured to perform a data query in the memory table in response to receiving a data query request initiated by a user; a data storage medium query unit, configured to perform a data query at the data storage medium layer in response to that a data query result for the memory table does not satisfy a data query condition in the data query request; and a query result providing unit, configured to provide the obtained data query result to the user. The data storage medium query unit includes: a master data block query module, configured to initiate in parallel at least one master data block asynchronous IO query for the hierarchical storage layer to the database system; a master data block analysis module, configured to: after receiving a query response to all master data block asynchronous IO queries, perform data analysis on a master data block obtained through a query; and a data query result determining module, configured to determine a data query result for the data query request based on the data query result for the memory table and/or a data analysis result of the master data block.

Optionally, in an example of the aspect, the master data block includes metadata used to record storage location information of a corresponding additional data block in the data storage file. The data storage medium query unit further includes: an additional data block query module, configured to initiate in parallel an additional data block asynchronous IO query for a to-be-queried additional data block to the database system in response to that the data analysis result of the master data block indicates that an additional data block needs to be queried; and an additional data block analysis module, configured to: after receiving a query response to all additional data block query requests, perform data analysis on an additional data block obtained through a query. The data query result determining module determines the data query result for the data query request based on the data query result for the memory table, the data analysis result of the master data block, and/or a data analysis result of the additional data block.

Optionally, in an example of the aspect, the data are stored in the database system layer by layer in the above-mentioned manner. The master data block query module can include: a master data block locating submodule, configured to: for each hierarchical storage layer, locate a data storage file at the hierarchical storage layer based on a common hash value of a key of to-be-queried data, and locate storage location information of a master data block in the data storage file based on a perfect hash value of the key; a master data block query request generation submodule, configured to: for each to-be-queried master data block, generate a corresponding master data block asynchronous IO query request based on the storage location information of the master data block in the data storage file at the corresponding hierarchical storage layer; and a master data block query initiation submodule, configured to send in parallel all generated master data block asynchronous IO query requests to the database system.

Optionally, in an example of the aspect, the additional data block query module can include: an additional data block locating submodule, configured to: in response to that the data analysis result of the master data block indicates that the additional data block needs to be read, obtain the storage location information that is of the additional data block in the data storage file and that is recorded in the metadata in the corresponding master data block; an additional data block query request generation submodule, configured to: for each to-be-queried additional data block, generate an additional data block asynchronous IO query request based on storage location information of the additional data block in the data storage file; and an additional data block query initiation submodule, configured to send in parallel all generated additional data block asynchronous IO query requests to the database system.

According to another aspect of the embodiments of this specification, a database system is provided, including: a data storage apparatus; the above-mentioned data query apparatus; a memory layer; and a nonvolatile data storage medium layer, including at least one hierarchical storage layer. The data storage apparatus sequentially stores data in a memory table at the memory layer and a data storage file at the at least one hierarchical storage layer, and data in the data storage file are stored as at least one master data block.

Optionally, in an example of the aspect, the data storage apparatus can include: a memory writing unit, configured to write to-be-stored data into the memory table at the memory layer; and a data storage medium writing unit, configured to write stored data in the memory table into the at least one hierarchical storage layer at the data storage medium layer in response to that the memory table is fully written. The data storage medium writing unit includes: a data reading module, configured to read all stored data in a data storage file at a current hierarchical storage layer; a data combination module, configured to combine written upper-layer stored data with the read stored data; a data division module, configured to divide a value corresponding to each key in combined stored data into at least one master data block; a storage location determining module, configured to determine, based on a common hash value and a perfect hash value of a key corresponding to each master data block, a data storage file in which each master data block is located and an offset of each master data block in the data storage file in which each master data block is located, where each data storage file corresponds to a common hash value range; and a data writing module, configured to perform data writing on each master data block based on the determined data storage file in which each master data block is located and the offset of each master data block in the data storage file in which each master data block is located, where the data storage medium writing unit performs layer-by-layer data writing on stored data in the memory table starting from a top hierarchical storage layer, until lower-layer data writing is not triggered.

Optionally, in an example of the aspect, the data division module divides the value corresponding to each key in the combined stored data into the at least one master data block and a corresponding additional data block; and the data writing module performs data writing on each master data block and a corresponding additional data block based on the determined data storage file in which the master data block is located and the offset of the master data block in the data storage file in which the master data block is located, where a written master data block includes metadata, and the metadata are used to record storage location information of each additional data block of the master data block in the data storage file.

According to another aspect of the embodiments of this specification, a data query apparatus is provided, including: at least one processor; a storage coupled to the at least one processor; and a computer program stored in the storage. The at least one processor executes the computer program to implement the above-mentioned data query method.

BRIEF DESCRIPTION OF DRAWINGS

The essence and advantages of the content of this specification can be further understood by referring to the following accompanying drawings. In the accompanying drawings, similar components or features may have the same reference numerals.

DESCRIPTION OF EMBODIMENTS

Figure 1:
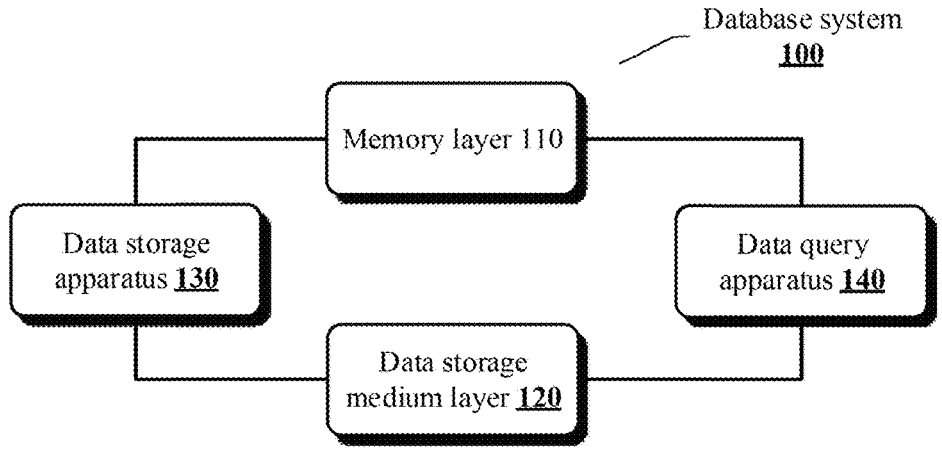
FIG. 1 is an example schematic diagram illustrating a database system, according to one or more embodiments of this specification.

The subject matters described in this specification are discussed below with reference to example implementations. It should be understood that the discussion of these implementations is merely intended to enable a person skilled in the art to better understand the subject matters described in this specification, and is not intended to limit the protection scope, applicability, or examples described in the claims. The functions and arrangements of the elements under discussion can be changed without departing from the protection scope of this specification. Various processes or components can be omitted, replaced, or added in various examples as needed. For example, the described method can be performed in a sequence different from the described sequence, and the steps can be added, omitted, or combined. In addition, the features described in some examples can also be combined in other examples.

As used in this specification, the term "include" and variants thereof represent an open term, which means "including but not limited to". The term "based on" represents "at least partially based on". The terms "one embodiment" and "one or more embodiments" represent "at least one embodiment". The term "another embodiment" represents "at least one other embodiment". The terms "first", "second", etc. can refer to different or identical objects. Other definitions, whether explicit or implicit, may be included below. Unless expressly specified in the context, the definition of a term is consistent throughout this specification.

Before describing the embodiments according to this specification with reference to the accompanying drawings, several terms mentioned in the embodiments of this specification are first described briefly.

A common hash operation is to perform a hash operation on data based on a common hash function. A hash collision may occur when the hash operation is performed based on the common hash function. In other words, the same hash value can be obtained by performing the hash operation on two pieces of different data based on the common hash function.

A perfect hash operation is a hash operation in which no hash collision occurs, and maps N input integer data sets onto M integer spaces based on a perfect hash function. Here, N≤M. When the perfect hash operation is performed, for a given data set, hash values obtained after any key 1 and key 2 are processed based on a perfect hash function H are not the same. That is, H (Key 1)!=H (Key 2).

In this specification, original data are processed into key-value (KV) data, and a value corresponding to each key is stored in a database system. An example of the original data can include but is not limited to common KV data, wide table data, graph data, etc. For the common KV data, each key corresponds to one value. For KV data obtained after the wide table data and the graph data are processed, one key may have a plurality of data columns, or one graph node has a plurality of one-degree edges. In other words, one key can correspond to a plurality of values. The plurality of values can form a large value, and the large value is stored in a database. The large value can be stored as one data block, or can be divided into one master data block and one or more additional data blocks for storage. In this specification, to-be-stored data include a value in the KV data, and are data to be stored in the database system.

The following describes a database system, a data storage method, a data storage apparatus, a data query method, and a data query apparatus according to the embodiments of this specification with reference to the accompanying drawings.

FIG. 1 is an example schematic diagram illustrating a database system 100, according to one or more embodiments of this specification. The database system 100 can also be referred to as a server of a database application, and is configured to provide a data storage service and a data query service. The database system 100, for example, can be implemented by a device having a computing capability.

As shown in FIG. 1, the database system 100 includes a memory layer 110 and a data storage medium layer 120. The memory layer 110 can include a memory pool including at least one memory (for example, a memory of a computer device). The memory layer 110 can also be referred to as an internal memory and a main memory. The memory layer 110, for example, can be configured to temporarily store operation data in a CPU of a computing device and data exchanged with an external data storage medium such as a disk. The data storage medium layer 120 can also be referred to as an external memory. When the computing device reads data at the data storage medium layer 120, a data read operation such as an IO operation needs to be initiated to the data storage medium layer 120, to read the data at the data storage medium layer 120 into the memory. The data storage medium layer 120, for example, can be various nonvolatile storage media such as a disk device and a storage card. The disk is a memory that stores data based on a magnetic recording technology. Examples of the disk, for example, can include various forms of soft disks and hard disks.

The database system 100 further includes a data storage apparatus 130. The data storage apparatus 130 is configured to sequentially store to-be-stored data at the memory layer 110 and at least one hierarchical storage layer of the data storage medium layer 120 of the database system. For example, the data storage apparatus 130 can sequentially store, in a time sequence, the to-be-stored data at the memory layer 110 and the at least one hierarchical storage layer of the data storage medium layer 120 of the database system.

The database system 100 further includes a data query apparatus 140. The data query apparatus 140 is configured to: in response to a data query request initiated by a user, perform a data query at the memory layer 110 or the data storage medium layer 120 of the database system, and provide a data query result for the user.

Figure 2:
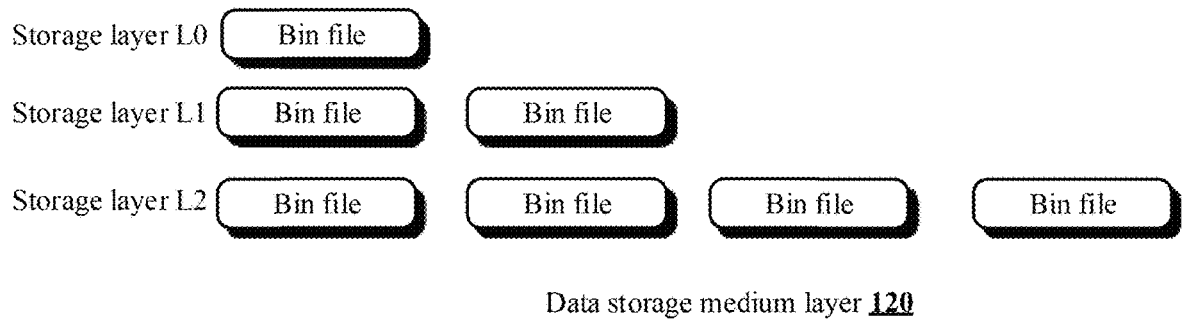
FIG. 2 is an example schematic diagram illustrating a data storage medium layer, according to one or more embodiments of this specification.

In some embodiments of this specification, the data storage medium layer 120 can be layered into at least two hierarchical storage layers, and a hierarchical relationship is formed between all of the at least two hierarchical storage layers, to constitute a hierarchical storage layer structure. FIG. 2 is an example schematic diagram illustrating a data storage medium layer 120, according to one or more embodiments of this specification.

As shown in FIG. 2, the data storage medium layer 120 is layered into three hierarchical storage layers, that is, a hierarchical storage layer L0, a hierarchical storage layer L1, and a hierarchical storage layer L2. The hierarchical storage layer L0 is a top storage layer of a hierarchical storage layer structure, the hierarchical storage layer L1 is a lower hierarchical storage layer of the hierarchical storage layer L0, and the hierarchical storage layer L2 is a lower hierarchical storage layer of the hierarchical storage layer L1. It should be noted that a quantity of layers of the hierarchical storage layer structure can be a predetermined quantity of layers.

Each hierarchical storage layer can include a predetermined quantity of data storage files (for example, Bin files). In some embodiments, quantities of data storage files at all hierarchical storage layers can be the same. In some embodiments, quantities of data storage files at all hierarchical storage layers can be different. For example, in some examples, when the data storage medium layer is layered, the quantities of data storage files specified for all the hierarchical storage layers can be sequentially in ascending order layer by layer starting from the top hierarchical storage layer. As shown in FIG. 2, quantities of Bin files specified for the hierarchical storage layer L0, the hierarchical storage layer L1, and the hierarchical storage layer L2 are sequentially in ascending order from top to bottom starting from the top storage layer L0. That is, the hierarchical storage layer L0 includes one Bin file, the hierarchical storage layer L0 includes two Bin files, and the hierarchical storage layer L2 includes four Bin files. It should be noted that FIG. 2 shows only an example of the hierarchical storage structure of the data storage medium layer. In other embodiments, a hierarchical storage structure that includes another quantity of data storage files can be used. Preferably, a quantity of data storage files included at each hierarchical storage layer can be a power of 2.

The data storage file at the hierarchical storage layer is used to store a value of to-be-stored data. When the value of the to-be-stored data is written into the data storage file, a value corresponding to each key in the to-be-stored data can be divided into at least one master data, and a storage location (that is, an offset relative to a header address of the data storage file) of the corresponding value in the data storage file is determined based on the key. Then, the at least one piece of master data obtained through division is written into the corresponding data storage file based on determined storage location information. In some embodiments, a value corresponding to each key in the to-be-stored data can be divided into at least one master data and a corresponding additional block data, and a storage location (that is, an offset relative to a header address of the data storage file) of the corresponding value in the data storage file is determined based on the key. Then, the at least one piece of master data and the corresponding additional block data obtained through division are written into the corresponding data storage file based on determined storage location information.

Figure 3:
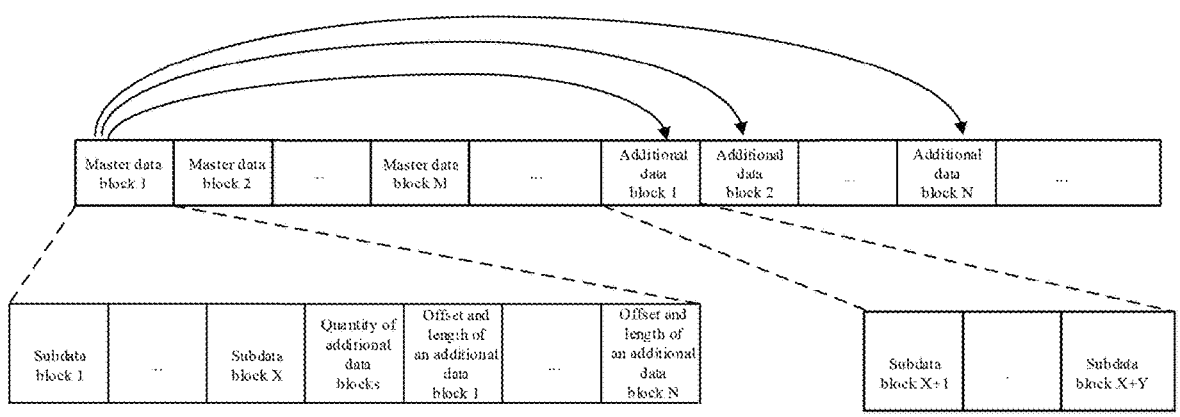
FIG. 3 is an example schematic diagram illustrating a data storage file, according to one or more embodiments of this specification.

FIG. 3 is an example schematic diagram illustrating a data storage file, according to one or more embodiments of this specification.

In an example in FIG. 3, the data storage file includes a plurality of master data blocks, for example, a master data block 1, a master data block 2, and a master data block M. Each master data block corresponds to some or all values of one key. Optionally, some or all master data blocks each can further include one or more additional data blocks. For example, the master data block 1 can include an additional data block 1, and an additional data block 2 to an additional data block N. The additional data blocks 1 to N are used to store remaining values of a key corresponding to the master data block of the additional data blocks 1 to N. In other words, a value of one key in the to-be-stored data can be divided into one master data block and one or more additional data blocks. In some embodiments, when a value of one key is small, the value of the key can be divided into a master data block, without additional data blocks.

It should be noted that, in the data storage file in this specification, as shown in FIG. 3, master data blocks corresponding to all keys are continuously stored, and a storage location of a master data block corresponding to each key in the data storage file can be determined based on a perfect hash value of the key. In addition, corresponding additional data blocks of each master data block can be continuously stored, as shown in FIG. 3, or can be separately stored.

Figures 4, 5:
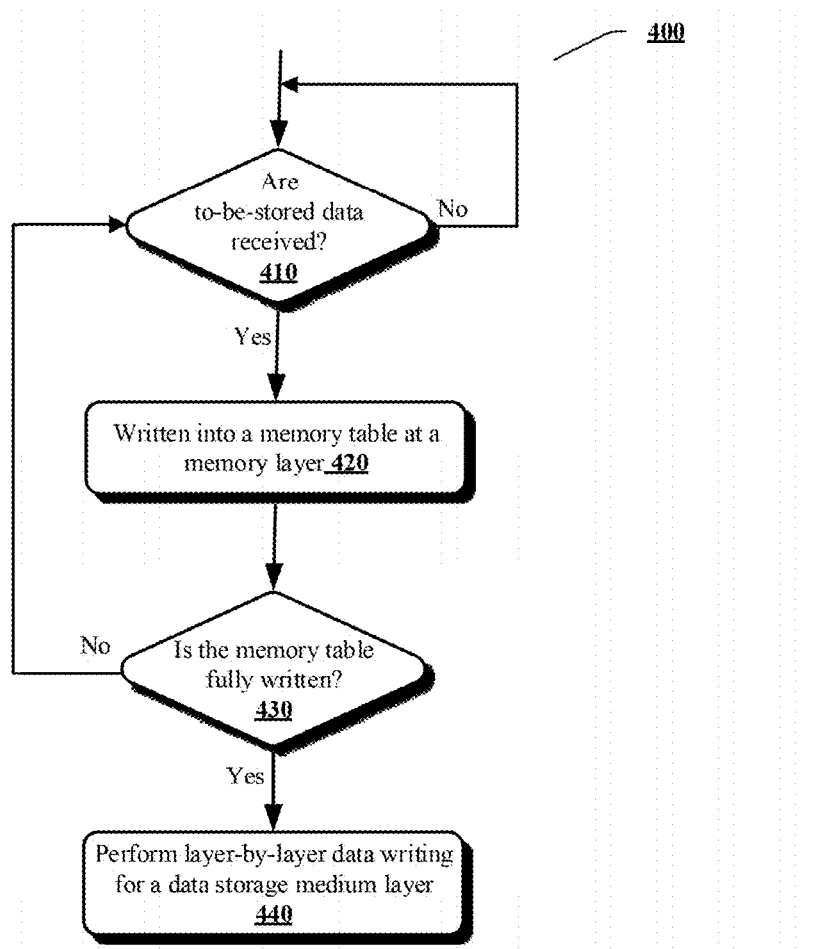
FIG. 4 is an example flowchart illustrating a data storage method, according to one or more embodiments of this specification.
FIG. 5 is an example schematic diagram illustrating to-be-stored original data, according to one or more embodiments of this specification.

When the master data block is written into the data storage file, in addition to a corresponding subdata block (that is, data content recorded by the master data block), the master data block further needs to record corresponding metadata (if an additional data block exists). For example, one subdata block can correspond to one value. FIG. 5 is used as an example. A subdata block 1 stores a user name, and a subdata block 2 stores a user age. The metadata are used to record storage location information of each additional data block of the master data block in the data storage file. In some embodiments, the metadata can record a quantity of additional data blocks, an offset of each additional data block in the data storage file, and a data length. In other words, the storage location information of the additional data block in the data storage file can be represented by the offset of each additional data block in the data storage file and the data length. As shown in FIG. 3, the master data block 1 includes N additional data blocks. Therefore, there are N additional data blocks of the master data block 1. In addition, the metadata further record offsets of the additional data blocks 1 to N in the data storage file and corresponding data lengths. The offset that is of the additional data block and that is recorded in the metadata is used to indicate an offset of a header address of a storage location of the additional data block in the data storage file relative to the header address of the data storage file. Each additional data block is recorded at a corresponding location of the data storage file, and the recorded additional data block can include one or more subdata blocks. For example, the additional data block 1 includes a subdata block X+1 to a subdata block X+Y.

In this specification, the to-be-stored data are sequentially stored in a memory table at a memory layer and a data storage file at at least one hierarchical storage layer, and data in the data storage file are stored as at least one master data block, or are stored as at least one master data block and a corresponding additional data block. When the master data block includes an additional data block, the master data block further has metadata used to record storage location information of the corresponding additional data block in the data storage file. The storage location information of the additional data block in the data storage file, for example, can be represented by an offset of the additional data block in the data storage file and a data length.

FIG. 4 is an example flowchart illustrating a data storage method, according to one or more embodiments of this specification. The data storage method shown in FIG. 4 can be performed by a data storage apparatus 130 in a database system. In some embodiments, the data storage apparatus 130 can be implemented as a thread (referred to as a data storage thread below) that is of a database system (database application server) and that is used to implement data storage.

As shown in FIG. 4, in response to triggering writing of to-be-stored data into the database system, the to-be-stored data are written into a memory table (for example, MemTable) at a memory layer of the database system. For example, in 410, the data storage thread monitors whether the to-be-stored data are received. The to-be-stored data, for example, can be to-be-stored data entered by a user by using a client device of a database application. If the to-be-stored data are not received, the data storage thread continuously performs monitoring. If the to-be-stored data are received, in 420, the data storage thread writes the to-be-stored data into the memory table MemTable.

FIG. 5 is an example schematic diagram illustrating to-be-stored original data, according to one or more embodiments of this specification. As shown in FIG. 5, the to-be-stored original data are key-value pair data. Each piece of key-value pair data can include a key-value pair (namely, key-value) including one key and at least one value. In an example in FIG. 5, a key of each piece of key-value pair data is a data ID, for example, an identity card number of the user, a registration number, a system number, etc. Value_1 indicates a user name, Value_2 indicates a user age, Value_5 indicates a user occupation, etc. In this specification, the term "to-be-stored data" is a value in the original data.

In 430, whether the memory table at the memory layer is fully written is determined. If it is determined that the memory table is fully written, in 440, stored data in the memory table are written into a hierarchical storage layer of a data storage medium layer in a layer-by-layer writing manner starting from a top hierarchical storage layer of the data storage medium layer of the database system. If it is determined that the memory table is not fully written, a current data storage process ends. Optionally, 410 can be performed again, to continue to monitor whether the to-be-stored data are received.

Figure 6:
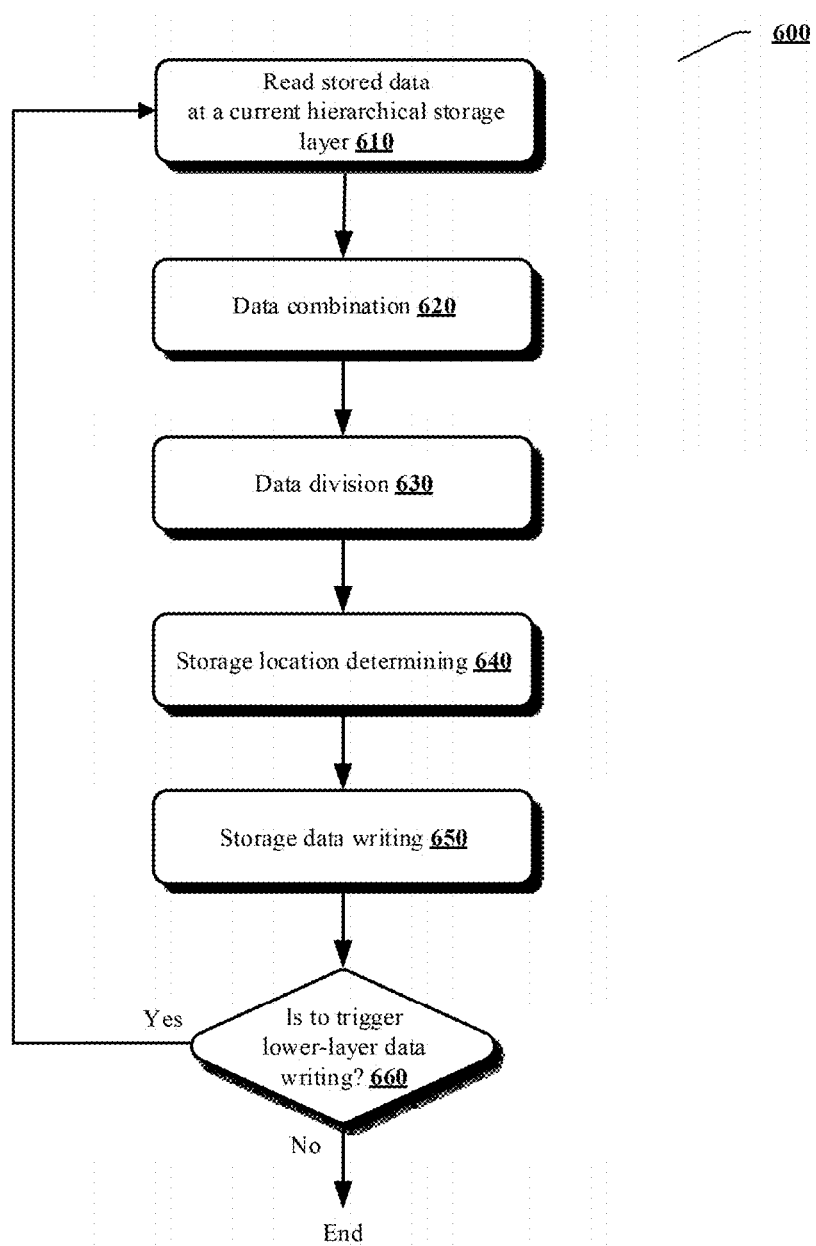
FIG. 6 is an example flowchart illustrating a layer-by-layer data writing method for a data storage medium layer, according to one or more embodiments of this specification.

FIG. 6 is an example flowchart illustrating a layer-by-layer data writing method 600 for a data storage medium layer, according to one or more embodiments of this specification. An example shown in FIG. 6 is a data writing process of a current hierarchical storage layer of a layer-by-layer data writing process.

As shown in FIG. 6, when data writing for the current hierarchical storage layer is triggered, in 610, all stored data at the current hierarchical storage layer are read. In other words, stored data in all data storage files (Bin files) at the current hierarchical storage layer are read. Data writing can be triggered in response to that the memory table is fully written or a file size of one or more data storage files at an upper hierarchical storage layer reaches or exceeds a predetermined threshold. Written stored data include stored data in the memory table or stored data in a data storage file that reaches or exceeds the predetermined threshold at the upper hierarchical storage layer.

Figure 7:
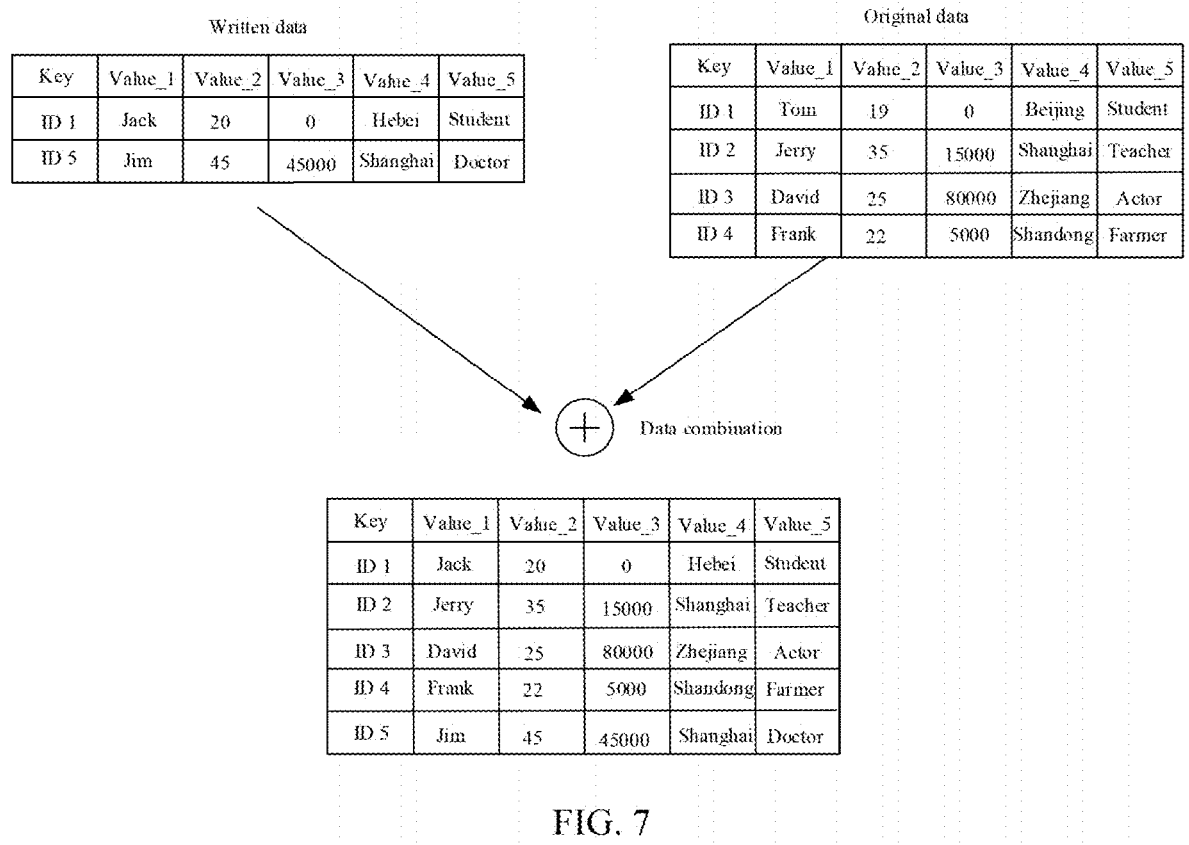
FIG. 7 is an example flowchart illustrating a data combination process, according to one or more embodiments of this specification.

In 620, the written stored data are combined with the read stored data at the current hierarchical storage layer. FIG. 7 is an example flowchart illustrating a data combination process, according to one or more embodiments of this specification. As shown in FIG. 7, when data combination is performed, for a same key, if a value is updated, new data are used to replace old data, for example, data corresponding to an ID 1. Alternatively, if first data include a key that does not exist in the old data, data corresponding to the key are added, for example, data corresponding to an ID 5. Then, a corresponding memory data index is generated based on updated stored data at the memory layer and a hash-based first index mechanism.

In 630, combined stored data are divided into each master data block and a corresponding additional data block. For example, stored data corresponding to each key can be divided into a master data block and a corresponding additional data block.

In some embodiments, data division can be performed on the combined stored data based on a data division algorithm. An example of the data division algorithm can include but is not limited to a data division algorithm based on a data use frequency; a data division algorithm based on a data column in an original data table; a data division algorithm based on a data timestamp range; and a graph data division algorithm based on an edge type, a quantity of edges, or an edge index.

The data division algorithm based on the data use frequency is data division performed based on whether the value is a commonly used value. Whether the value is a commonly used value can be determined in various applicable methods in the art, for example, can be determined based on whether a data query hit frequency (or the data use frequency) exceeds a predetermined value. Based on the data division algorithm, the commonly used value can be stored in the master data block, and an uncommonly used value can be stored in the additional data block, to avoid reading the additional data block during most data queries.

The data division algorithm based on the data column in the original data table is data division performed based on the data column in the original data table (for example, a wide table). For example, for a wide table with a large value, data division can be performed based on a column of the wide table. The data division algorithm based on the data timestamp range is data division performed based on a timestamp of to-be-stored data. In the data division method, each data block includes stored data in a specific timestamp range. The graph data division algorithm based on the edge type, the quantity of edges, or the edge index is a data division algorithm applicable to graph data. In the data division algorithm, data division can be performed on the graph data based on the edge type, the quantity of edges, or the edge index.

In 640, a data storage file in which each master data block is located and an offset of each master data block in the data storage file in which each master data block is located are determined based on a common hash value and a perfect hash value of a key corresponding to each master data block. Each data storage file corresponds to a common hash value range.

In this specification, each hierarchical storage layer is set to correspond to a first hash value range, and the first hash value range, for example, can be an integer range, for example, [0, K−1]. Here, K is a power of 2. A common hash value range corresponding to each data storage file at each hierarchical storage layer is obtained by dividing a common hash value range of the hierarchical storage layer by a quantity of data storage files at the hierarchical storage layer. For example, for a data storage medium layer in FIG. 2, a common hash value range of a data storage file at a hierarchical storage layer L0 is [0, K−1], common hash value ranges of two data storage files at a hierarchical storage layer L1 are respectively [0, K/2−1] and [K/2, K−1], and common hash value ranges of four data storage files at the hierarchical storage layer L1 are [0, K/4−1], [K/4, K/2−1], [K/2, 3K/4−1], and [3K/4, K−1].

To determine a storage location, the data storage file in which each master data block is located is determined based on the common hash value of the key corresponding to each master data block. For example, the common hash value of the key corresponding to each master data block is calculated, and then a common hash value range in which the common hash value is located is determined based on the common hash value of the key corresponding to the master data block, to determine the data storage file in which each master data block is located. For each master data block, if a hash value calculated based on a common hash operation exceeds a specified first hash value range (namely, the common hash value range corresponding to the hierarchical storage layer), a modulo operation is performed by using a quantity of hash values in the first hash value range as a modulus, and an obtained remainder is a common hash value. After the data storage file in which each master data block is located is determined, for each data storage file, a perfect hash function corresponding to the data storage file is determined based on keys of all master data blocks included in the data storage file, and a perfect hash operation is performed on the key of each master data block in the data storage file based on the determined perfect hash function, to determine an offset of each master data block in the data storage file in which each master data block is located.

After a storage location of each master data block is determined as above mentioned, in 650, data writing is performed on each master data block and a corresponding additional data block based on the determined data storage file in which each master data block is located and the offset in the data storage file in which each master data block is located. When a written master data block includes one or more additional data blocks, the written master data block can further include metadata. The metadata are used to record storage location information of each additional data block of the master data block in the data storage file. For example, the metadata in the master data block can record a quantity of additional data blocks, an offset of each additional data block in the data storage file, and a data length. Therefore, the metadata are used to locate a storage location of each additional data block and write the additional data block.

Optionally, after the stored data in the memory table are written into the hierarchical storage layer of the data storage medium layer, the corresponding stored data can be deleted from the memory table, to release corresponding storage space at the memory layer. In addition, optionally, after the stored data at the hierarchical storage layer are written into a lower hierarchical storage layer, the corresponding stored data can also be deleted from the hierarchical storage layer.

Back to FIG. 6, after the master data block and the additional data block corresponding to the master data block are written, in 660, whether to trigger lower-layer data writing is determined. For example, whether the file size of the one or more data storage files at the current hierarchical storage layer reaches or exceeds the predetermined threshold is determined. If the file size of the one or more data storage files at the current hierarchical storage layer reaches or exceeds the predetermined threshold, lower-layer data writing is triggered. In other words, lower-layer data writing is performed on stored data in the one or more data storage files whose file size reaches or exceeds the predetermined threshold at the current hierarchical storage layer. Then, back to 610, a lower-layer data writing process is cyclically performed. If a file size of no data storage file at the current hierarchical storage layer reaches the predetermined threshold, a data storage process ends.

It should be noted that in an example in FIG. 6, the data storage process is described by using an example in which data in the data storage file are stored as data of at least one master data block and a corresponding additional data block. When the data in the storage file are stored as at least one master data block, operation content related to storage of the additional data block shown in FIG. 6 can be omitted.

The following uses an example to describe the data storage process in this embodiment of this specification. In the example, the database system includes a memory and a hard disk, and the hard disk is divided into layers L0 to L3. The memory, the layer L0, and the layer L1 store data. The stored data are user data in a user information system. A key is a user id, and a value is various information of a user. For a user id 1, a name of the user id 1 is recorded in the memory, an address of the user id 1 is recorded at the layer L0, and a telephone number of the user id 1 is recorded at the layer L1.

It is assumed that an identity card number of the user id 1 needs to be inserted. Data in a memory table are stored in a linked list. Therefore, after the identity card number of the user id 1 is inserted into the memory table, there are two pieces of information in a linked list of the user id 1. One is the newly inserted identity card number, and the other is an original saved name.

If the memory table is full after the identity card number is inserted, the stored data in the memory table need to be combined into a Bin file at the layer L0. In this case, old data (for example, subdata such as a telephone number) stored in the Bin file at the layer L0 need to be read from the layer L0, a read telephone number is combined with the stored data (for example, subdata such as an identity card and the name of the user id 1) in the memory table, and combined data are written into a new Bin file at the layer L0. Subdata such as the telephone number, the identity card, and the name can be placed in a master data block of the Bin file together, or can be separately placed in a master data block and an additional data block of the Bin file. For example, if the name is the most frequently accessed subdata, and the identity card number and the telephone number are not commonly used subdata, the name can be placed in the master data block, and the identity card number and the telephone number are respectively placed in the two additional blocks. In addition, when there are too much subdata, if the subdata are placed in one master data block, the master data block is too large, and therefore, the subdata can be divided into a master block and an additional block that have proper sizes. Here, a data division manner of the master data block and the additional data block can be a customized manner.

After data are written from the memory table to the layer L0, if a size of the Bin file at the layer L0 reaches a predetermined threshold, the Bin file at the layer L0 needs to be combined with a Bin file at the layer L1, and is written into the layer L1, to obtain a new Bin file at the layer L1. A data writing process of the layer L1 is similar to a data writing process of the layer L0. Details are omitted here for simplicity.

The data storage process according to this embodiment of this specification is described above with reference to the accompanying drawings. After the data are stored in the database system in the above-mentioned data storage method, a data query can be performed in response to a data query request initiated by a user.

Figure 8:
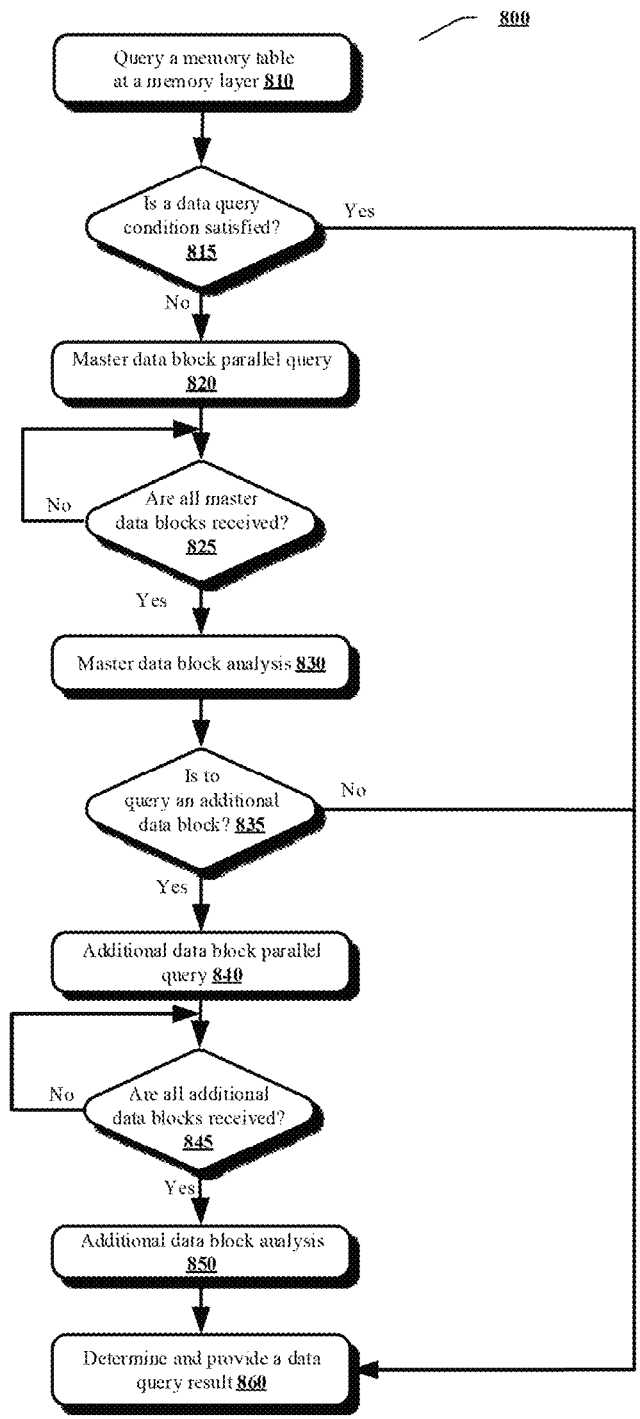
FIG. 8 is an example flowchart illustrating a data query method, according to one or more embodiments of this specification.

FIG. 8 is an example flowchart illustrating a data query method 800, according to one or more embodiments of this specification. The data query method in FIG. 8 can be performed by a data query apparatus in a database system. The data query apparatus can be implemented as a thread (referred to as a data query thread below) used to implement a data query in the database system (a database application server).

As shown in FIG. 8, in 810, a data query is performed in a memory table at a memory layer in the database system in response to receiving a data query request initiated by a user. In an example, the data query request can include a key of to-be-queried target data and a data query condition.

After the data query for the memory table is completed to obtain a data query result for the memory table, in 815, whether the data query for the memory table satisfies the data query condition in the data query request is determined. In other words, whether a corresponding data query is completed for all data query conditions that need to be queried in the data query request. For example, if the memory table at the memory layer stores only an identity card and a name of a user id 1, and the data query condition indicates that the identity card, the name, and a registration date of the user id 1 need to be queried, because there is no registration date in the memory table, the data query result for the memory table does not satisfy the data query condition in the data query request.

If the data query for the memory table completely satisfies the data query condition in the data query request, in 860, a data query result for the data query request is determined based on the data query result for the memory table, and is provided for the user. For example, based on the data query condition, the data query result for the memory table is backfilled into the data query result for the data query request, and a data query result backfilled with data is provided for the user.

If the data query for the memory table does not satisfy the data query condition in the data query request, in 820, a master data block asynchronous IO query for each hierarchical storage layer is initiated in parallel to the database system. For example, a data storage location of the master data block can be located, a corresponding master data block asynchronous IO query request can be generated, and all generated master data block asynchronous IO query requests are sent in parallel to an operating system of the database system, to initiate the master data block asynchronous IO query.

Figure 9:
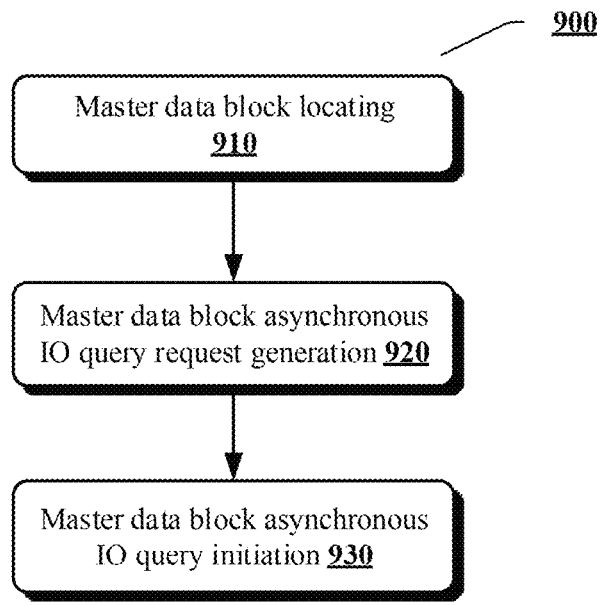
FIG. 9 is an example flowchart illustrating a master data block query process, according to one or more embodiments of this specification.

FIG. 9 is an example flowchart illustrating a master data block query process 900, according to one or more embodiments of this specification. In an example in FIG. 9, data are stored in a database system in a data storage manner shown in FIG. 4 and FIG. 6.

As shown in FIG. 9, in 910, for each hierarchical storage layer, the master data block is located. To be specific, a data storage file at the hierarchical storage layer is determined based on a common hash value of a key of to-be-queried data, and storage location information of the master data block in the data storage file is located based on a perfect hash value of the key. For example, an offset and a data length of the master data block in the data storage file are located based on the perfect hash value of the key.

For example, a common hash operation is performed on a key of target data to obtain a common hash value, and then a specific data storage file with a common hash value range within which a common hash value falls at a current hierarchical storage layer is determined, to locate a data storage file in which the target data are located. After the data storage file in which the target data are located is located, a perfect hash value is obtained by performing a perfect hash operation on the key of the target data based on a perfect hash function corresponding to the data storage file, so that an offset of the master data block in the data storage file is located, and the data length of the master data block is determined based on an offset of a next master data block in the data storage file. It should be noted that, when data storage is performed, because keys of all master data blocks are known and continuously stored, an offset of each master data block can be learned of.

After the storage location information of the master data block in the data storage file is located, in 920, for each to-be-queried master data block, a corresponding master data block asynchronous IO query request is generated based on storage location information of the master data block in a data storage file at a corresponding hierarchical storage layer. For example, if the hierarchical storage layer is N, a maximum of N master data block asynchronous IO query requests are generated. In some cases, a quantity of generated master data block asynchronous IO query requests can be less than N. For example, if a hierarchical storage layer does not store a data storage file, or a queried key is not stored at a hierarchical storage layer, the master data block asynchronous IO query request is not generated for the hierarchical storage layer.

After the master data block asynchronous IO query request for each to-be-queried master data block is generated, in 930, all the generated master data block asynchronous IO query requests are sent in parallel to the database system. In some embodiments, a master data block callback function can be set, and a master data block asynchronous IO read request is sent to the operating system of the database system, so that the operating system initiates an IO data read operation to the hierarchical storage layer of the data storage medium layer. Therefore, a corresponding master data block is read from the data storage file at the corresponding hierarchical storage layer of the data storage medium layer.

Back to FIG. 8, in 825, whether a query response to all master data block asynchronous IO queries is received is determined. In other words, whether all master data blocks returned in response to all master data block asynchronous IO queries are received is determined. If all master data blocks are not received, waiting and receiving continues to be performed and subsequent processing is not performed on a received master data block, until all master data blocks are received.

Because a completion time sequence of different asynchronous IO query requests for different master data blocks is uncertain, a call sequence of a master data block callback function of each master data block asynchronous IO query is also not fixed. After a master data block at a hierarchical storage layer i is successfully read and returned by the operating system, the master data block callback function counts a quantity of returned requests by +1, and i and the master data block are stored, without performing data analysis on the master data block temporarily. When a quantity of returned requests of the master data block callback function reaches a quantity of sent master data block asynchronous IO query requests, it is determined that the query response to all the master data block asynchronous IO queries is received.

After receiving the query response to all the master data block asynchronous IO queries, in 830, data analysis is performed on all master data blocks obtained through a query. For example, layer-by-layer data analysis can be performed on all the master data blocks obtained through a query. For example, analysis is performed layer by layer in an ascending order.

In 835, whether an additional data block needs to be queried is determined based on data analysis results of all the master data blocks. For example, whether an additional data block needs to be further queried can be determined based on metadata in an analyzed master data block and a data query condition. For example, when data analysis at each layer is completed, whether a master data block at the layer has an additional data block and whether the corresponding additional data block needs to be further queried are determined based on metadata in the master data block and the data query condition.

If the data analysis result of the master data block indicates that no additional data block needs to be queried, in 860, the data query result for the data query request is determined based on the data query result for the memory table and the data analysis result of the master data block, and is provided for the user. For example, based on the data query condition, the data query result for the memory table and the data analysis result of the master data block are backfilled into the data query result for the data query request, and a data query result backfilled with data is provided for the user.

In 840, an additional data block asynchronous IO query for a to-be-queried additional data block is initiated in parallel to the database system in response to that the data analysis result of the master data block indicates that an additional data block needs to be queried. For example, a data storage location of each to-be-queried additional data block can be located, a corresponding additional data block asynchronous IO query request can be generated, and all generated additional data block asynchronous IO query requests are sent in parallel to the operating system of the database system, to initiate the additional data block asynchronous IO query.

Figure 10:
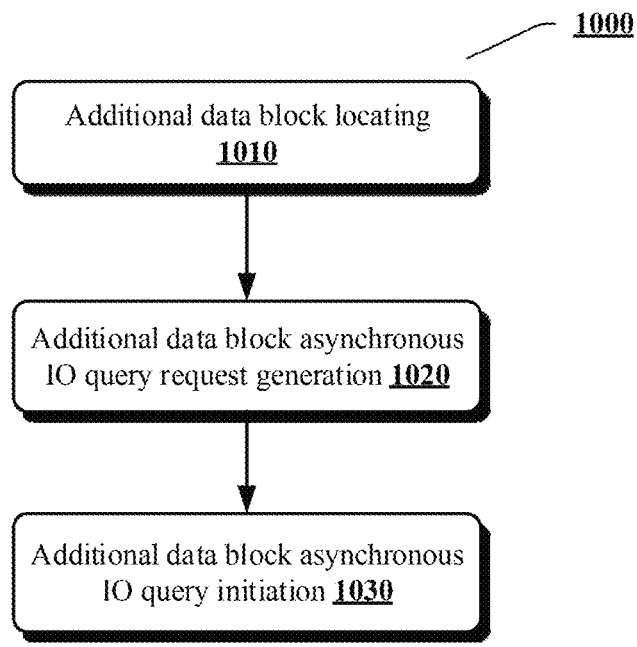
FIG. 10 is an example flowchart illustrating an additional data block query process, according to one or more embodiments of this specification.

FIG. 10 is an example flowchart illustrating an additional data block query process 1000, according to one or more embodiments of this specification. In an example in FIG. 10, data are stored in a database system in a data storage manner shown in FIG. 4 and FIG. 6.

As shown in FIG. 10, in 1010, for each to-be-queried additional data block, storage location information that is of an additional data block in the data storage file and that is recorded in metadata in a corresponding master data block is obtained. For example, an offset and a data length of each additional data block are obtained from metadata in an analyzed master data block.

In 1020, for each to-be-queried additional data block, a corresponding additional data block asynchronous IO query request is generated based on the obtained storage location information of the additional data block in the data storage file.

After the additional data block asynchronous IO query request is generated, in 1030, all the generated additional data block asynchronous IO query requests are sent in parallel to the database system. In some embodiments, an additional data block callback function can be set, and a generated additional data block asynchronous IO read request is sent in parallel to the operating system of the database system, so that the operating system initiates an IO data read operation to the hierarchical storage layer of the data storage medium layer. Therefore, a corresponding additional data block is read from the data storage file at the corresponding hierarchical storage layer of the data storage medium layer.

In 845, whether a query response to all additional data block asynchronous IO queries is received is determined. In other words, whether all additional data blocks returned in response to all additional data block asynchronous IO queries are received is determined. If all additional data blocks are not received, waiting and receiving continues to be performed and subsequent processing is not performed on a received additional data block, until all additional data blocks are received.

Because a completion time sequence of different asynchronous IO query requests for different additional data blocks is uncertain, a call sequence of an additional data block callback function of each additional data block asynchronous IO query is also not fixed. After an additional data block is successfully read and returned by the operating system, the additional data block callback function counts a quantity of returned requests by +1, and the additional data block is stored, without performing data analysis on the additional data block. When a quantity of returned requests of the additional data block callback function reaches a quantity of sent additional data block asynchronous IO query requests, it is determined that the query response to all the additional data block asynchronous IO queries is received. If it is determined that the query response to all the additional data block asynchronous IO queries is not received, receiving continues.

After a query response to all additional data block query requests is received, in 850, data analysis is performed on an additional data block obtained through a query.

After data analysis of all the additional data blocks is completed, in 860, the data query result is determined based on the data query result for the memory table, the data analysis result of all the master data blocks, and the data analysis result of all the additional data blocks, and is provided for the user. For example, based on the data query condition, the data query result for the memory table, the data analysis result of the master data block, and the data analysis result of the additional data block are backfilled into the data query result for the data query request, and a data query result backfilled with data is provided for the user.

Based on the above-mentioned data storage and data query solutions, parallel asynchronous IO queries are separately performed for a plurality of hierarchical master data blocks and additional data blocks of a same key, to effectively reduce a data query delay, thereby improving data query performance.

It should be noted that the data query process shown in FIG. 8 is a data query process when data in a data storage file are stored as data of at least one master data block and a corresponding additional data block. When the data in the storage file are stored as at least one master data block, operation content related to a query of the additional data block shown in FIG. 8 can be omitted.

Figure 11:
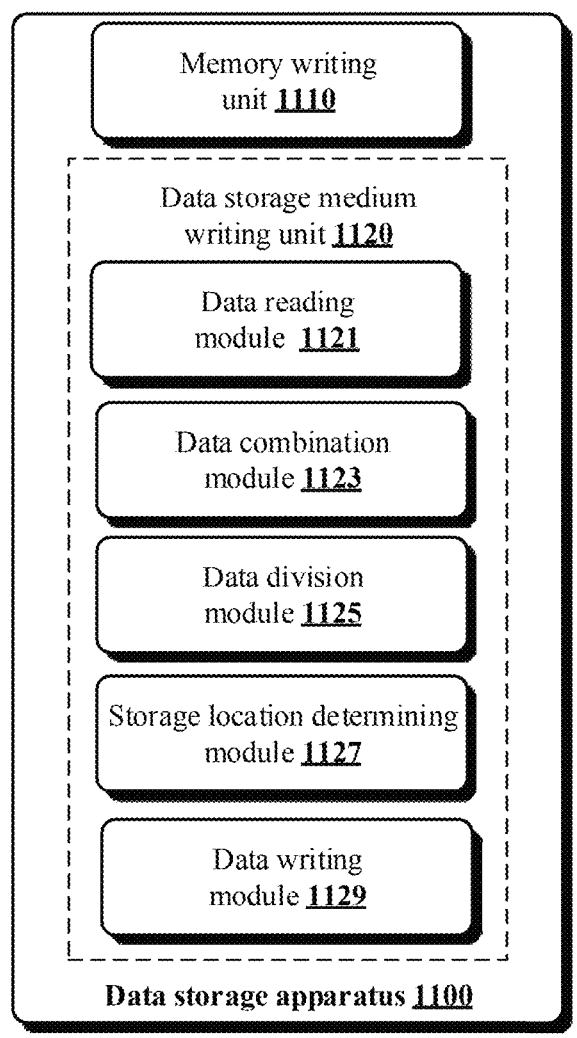
FIG. 11 is an example block diagram illustrating a data storage apparatus, according to one or more embodiments of this specification.

FIG. 11 is an example block diagram illustrating a data storage apparatus 1100, according to one or more embodiments of this specification. As shown in FIG. 11, the data storage apparatus 1100 can include a memory writing unit 1110 and a data storage medium writing unit 1120. The data storage medium writing unit 1120 includes a data reading module 1121, a data combination module 1123, a data division module 1125, a storage location determining module 1127, and a data writing module 1129.

The memory writing unit 1110 is configured to write to-be-stored data into a memory table at a memory layer of a database system. The to-be-stored data include a key-value pair. For an operation of the memory writing unit 1110, references can be made to the operation described above with reference to 420 in FIG. 4.

The data storage medium writing unit 1120 is configured to write stored data in the memory table into a data storage medium layer of the database system in response to that the memory table is fully written. Specifically, the data reading module 1121, the data combination module 1123, the data division module 1125, the storage location determining module 1127, and the data writing module 1129 in the data storage medium writing unit 1120 perform layer-by-layer data writing on the stored data in the memory table starting from a top hierarchical storage layer of the data storage medium layer, until lower-layer data writing is not triggered.

The data reading module 1121 is configured to read all stored data in a data storage file at a current hierarchical storage layer. The data combination module 1123 is configured to combine written upper-layer stored data with the read stored data.

The data division module 1125 is configured to divide a value corresponding to each key in combined stored data into at least one master data block.

The storage location determining module 1127 is configured to determine, based on a common hash value and a perfect hash value of a key corresponding to each master data block, a data storage file in which each master data block is located and an offset of each master data block in the data storage file in which each master data block is located. Each data storage file corresponds to a common hash value range.

The data writing module 1129 is configured to perform data writing on each master data block based on the determined data storage file in which each master data block is located and the offset of each master data block in the data storage file in which each master data block is located.

In some embodiments, the data division module 1125 is configured to divide the value corresponding to each key in the combined stored data into the at least one master data block and a corresponding additional data block. Correspondingly, the data writing module 1129 is configured to perform data writing on each master data block and a corresponding additional data block based on the determined data storage file in which the master data block is located and the offset of the master data block in the data storage file in which the master data block is located. A written master data block includes metadata, and the metadata are used to record storage location information of the additional data block of the master data block in the data storage file. For example, the metadata can record a quantity of additional data blocks, an offset of each additional data block in the data storage file, and a data length.

In some embodiments, in response to that a file size of one or more data storage files at the current hierarchical storage layer reaches or exceeds a predetermined threshold, the data storage medium writing unit 1120 can perform lower-layer data writing on stored data in a data storage file that reaches or exceeds the predetermined threshold at the current hierarchical storage layer.

In some embodiments, the data division module 1125 can be configured to perform data division on the combined stored data based on one of the following data division algorithm: a data division algorithm based on a data use frequency; a data division algorithm based on a data column in an original data table; a data division algorithm based on a data timestamp range; and a graph data division algorithm based on an edge type, a quantity of edges, or an edge index.

Figure 12:
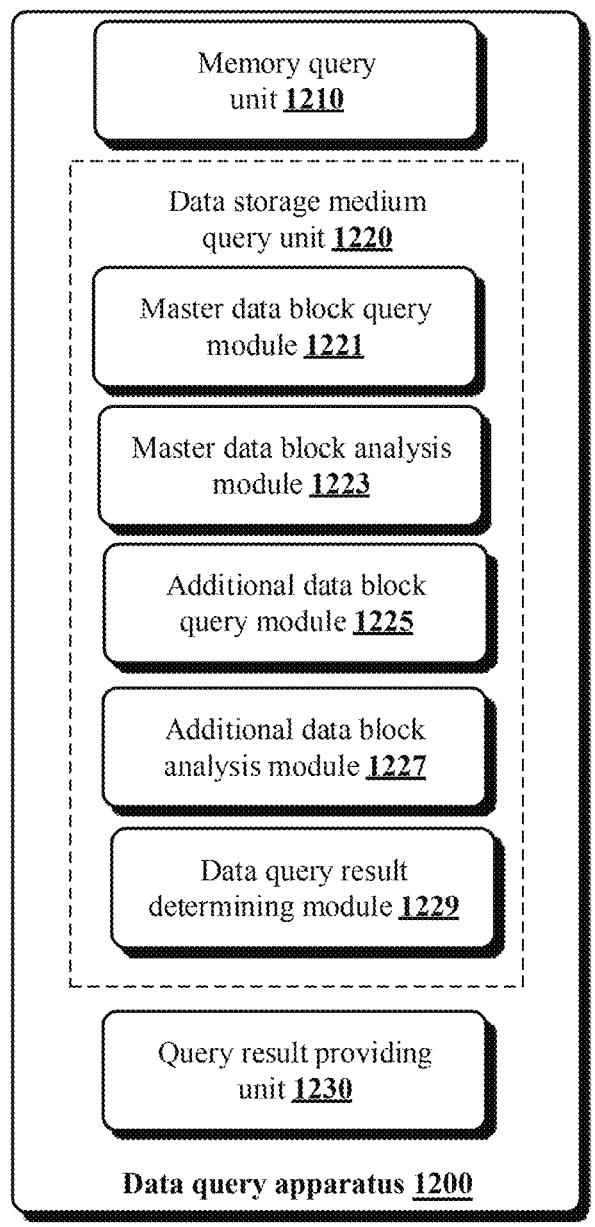
FIG. 12 is an example block diagram illustrating a data query apparatus, according to one or more embodiments of this specification.

FIG. 12 is an example block diagram illustrating a data query apparatus 1200, according to one or more embodiments of this specification. As shown in FIG. 12, the data query apparatus 1200 includes a memory query unit 1210, a data storage medium query unit 1220, and a query result providing unit 1230. The data storage medium query unit 1220 includes a master data block query module 1221, a master data block analysis module 1223, an additional data block query module 1225, an additional data block analysis module 1227, and a data query result determining module 1229.

The memory query unit 1210 is configured to perform a data query in a memory table at a memory layer in a database system in response to receiving a data query request initiated by a user. For an operation of the memory query unit 1210, references can be made to the operation described above with reference to 810 in FIG. 8.

The data storage medium query unit 1220 is configured to perform a data query at a data storage medium layer of the database system in response to that a data query result for the memory table does not satisfy a data query condition in the data query request.

Specifically, the master data block query module 1221 is configured to initiate in parallel at least one master data block asynchronous IO query for a hierarchical storage layer to the database system. For an operation of the master data block query module 1221, references can be made to the operation described above with reference to 820 in FIG. 8.

Figure 13:
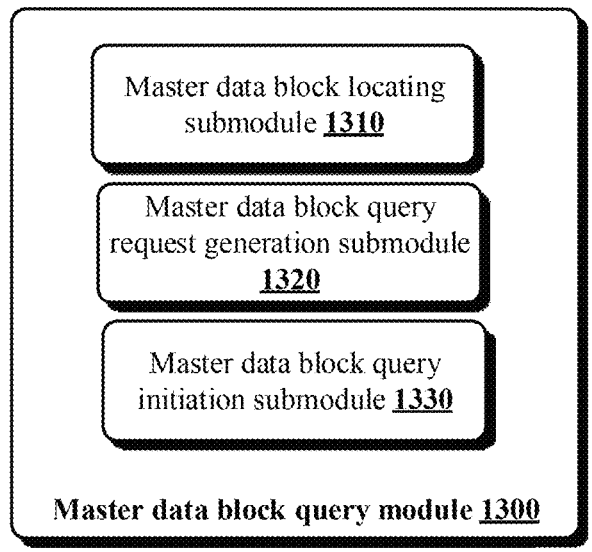
FIG. 13 is an example block diagram illustrating a master data block query module, according to one or more embodiments of this specification.

FIG. 13 is an example block diagram illustrating a master data block query module 1300, according to one or more embodiments of this specification. In an example in FIG. 13, data are stored in a database system in a data storage manner shown in FIG. 4 and FIG. 6. As shown in FIG. 13, the master data block query module 1300 includes a master data block locating submodule 1310, a master data block query request generation submodule 1320, and a master data block query initiation submodule 1330.

The master data block locating submodule 1310 is configured to: for each hierarchical storage layer, locate a data storage file at the hierarchical storage layer based on a common hash value of a key of to-be-queried data, and locate storage location information of a master data block in the data storage file based on a perfect hash value of the key. For an operation of the master data block locating submodule 1310, references can be made to the operation described above with reference to 910 in FIG. 9.

The master data block query request generation submodule 1320 is configured to: for each to-be-queried master data block, generate a corresponding master data block asynchronous IO query request based on the storage location information of the master data block in the data storage file at the corresponding hierarchical storage layer. For an operation of the master data block query request generation submodule 1320, references can be made to the operation described above with reference to 920 in FIG. 9.

The master data block query initiation submodule 1330 is configured to send in parallel all generated master data block asynchronous IO query requests to the database system. For an operation of the master data block query initiation submodule 1330, references can be made to the operation described above with reference to 930 in FIG. 9.

The master data block analysis module 1223 is configured to: after receiving a query response to all master data block asynchronous IO queries, perform data analysis on a master data block obtained through a query. For an operation of the master data block analysis module 1223, references can be made to the operation described above with reference to 830 in FIG. 8.

The additional data block query module 1225 is configured to initiate in parallel an additional data block asynchronous IO query for a to-be-queried additional data block to the database system in response to that the data analysis result of the master data block indicates that an additional data block needs to be queried. For an operation of the additional data block query module 1225, references can be made to the operation described above with reference to 840 in FIG. 8.

Figure 14:
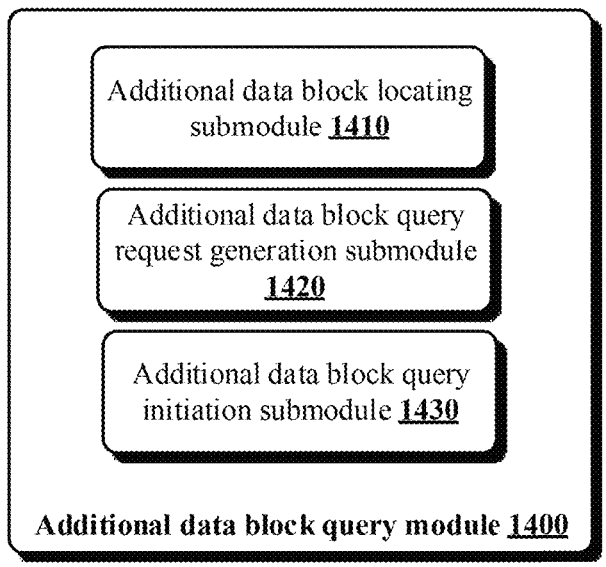
FIG. 14 is an example block diagram illustrating an additional data block query module, according to one or more embodiments of this specification.

FIG. 14 is an example block diagram illustrating an additional data block query module 1400, according to one or more embodiments of this specification. In an example in FIG. 14, data are stored in a database system in a data storage manner shown in FIG. 4 and FIG. 6. As shown in FIG. 14, the additional data block query module 1400 includes an additional data block locating submodule 1410, an additional data block query request generation submodule 1420, and an additional data block query initiation submodule 1430.

The additional data block locating submodule 1410 is configured to: in response to that the data analysis result of the master data block indicates that the additional data block needs to be read, obtain storage location information that is of the additional data block in the data storage file and that is recorded in metadata in the corresponding master data block. For an operation of the additional data block locating submodule 1410, references can be made to the operation described above with reference to 1010 in FIG. 10.

The additional data block query request generation submodule 1420 is configured to: for each to-be-queried additional data block, generate an additional data block asynchronous IO query request based on the storage location information of the additional data block in the data storage file. For an operation of the additional data block query request generation submodule 1420, references can be made to the operation described above with reference to 1020 in FIG. 10.

The additional data block query initiation submodule 1430 is configured to send in parallel all generated additional data block asynchronous IO query requests to the database system. For an operation of the additional data block query initiation submodule 1430, references can be made to the operation described above with reference to 1030 in FIG. 10.

After receiving a query response to all additional data block query requests, the additional data block analysis module 1227 performs data analysis on an additional data block obtained through a query. For an operation of the additional data block analysis module 1227, references can be made to the operation described above with reference to 850 in FIG. 8.

The data query result determining module 1229 is configured to determine a data query result for the data query request based on the data query result for the memory table, the data analysis result of the master data block, and the data analysis result of the additional data block. For an operation of the data query result determining module 1229, references can be made to the operation described above with reference to 860 in FIG. 8.

After the data query result for the data query request is obtained as described above, the query result providing unit 1230 provides the determined data query result for the user.

It should be noted that when data in the data storage file are merely stored as a master data block, the data query apparatus can have no need to include the additional data block query unit or the additional data block analysis unit. Correspondingly, the data query result determining module determines the data query result for the data query request based on the data query result for the memory table and the data analysis result of the master data block.

The data storage method, the data storage apparatus, the data query method, the data query apparatus, and the database system according to the embodiments of this specification are described above with reference to FIG. 1 to FIG. 14. The above-mentioned data query apparatus can be implemented by using hardware, or can be implemented by using software or a combination of hardware and software.

Figure 15:
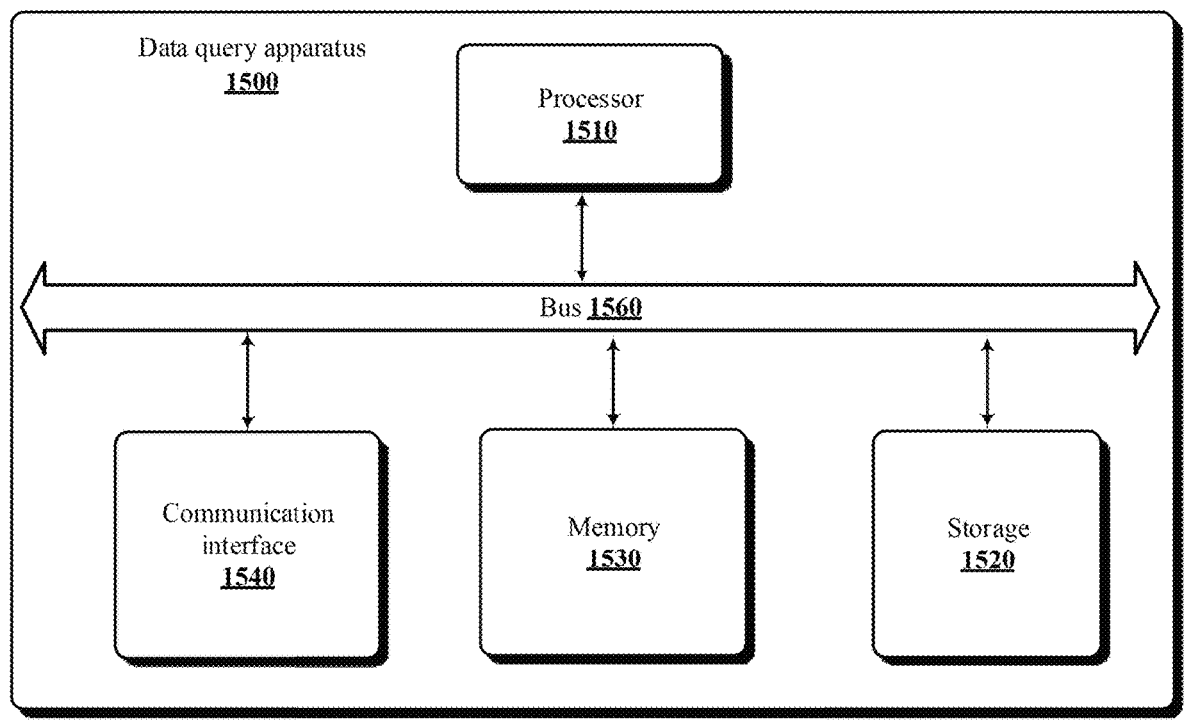
FIG. 15 is an example schematic diagram illustrating a data query apparatus implemented based on a computer system, according to one or more embodiments of this specification.

FIG. 15 is a schematic diagram illustrating a data query apparatus 1500 implemented based on a computer system, according to one or more embodiments of this specification. As shown in FIG. 15, the data query apparatus 1500 can include at least one processor 1510, a storage (for example, a nonvolatile memory) 1520, a memory 1530, and a communication interface 1540, and the at least one processor 1510, the storage 1520, the memory 1530, and the communication interface 1540 are connected together through a bus 1560. The at least one processor 1510 executes at least one computer-readable instruction (to be specific, the above-mentioned element implemented in a software form) stored or encoded in the storage.

In one or more embodiments, the storage stores a computer-executable instruction, and when the computer-executable instruction is executed, the at least one processor 1510 is enabled to perform the following operations: performing a data query in a memory table in response to receiving a data query request initiated by a user; initiating in parallel at least one master data block asynchronous IO query for a hierarchical storage layer to a database system in response to that a data query result for the memory table does not satisfy a data query condition in the data query request; after receiving a query response to all master data block asynchronous IO queries, performing data analysis on a master data block obtained through a query; and determining a data query result for the data query request based on the data query result for the memory table and/or a data analysis result of the master data block, and providing the data query result for the data query request for the user.

It should be understood that, when the computer-executable instruction stored in the storage is executed, the at least one processor 1510 is enabled to perform the above-mentioned operations and functions described with reference to FIG. 1 to FIG. 14 in the embodiments of this specification.

According to one or more embodiments, a program product such as a machine-readable medium (for example, a non-transitory machine-readable medium) is provided. The machine-readable medium can have an instruction (to be specific, the above-mentioned element implemented in a software form). When the instruction is executed by a machine, the machine is enabled to perform the above-mentioned operations and functions described with reference to FIG. 1 to FIG. 14 in the embodiments of this specification. Specifically, a system or an apparatus equipped with a readable storage medium can be provided, and software program code for implementing the functions in any of the above-mentioned embodiments is stored in the readable storage medium, so that a computer or a processor of the system or the apparatus reads and executes the instruction stored in the readable storage medium.

In such case, the program code read from the readable medium can implement the functions in any one of some embodiments described above, and therefore the machine-readable code and the readable storage medium storing the machine-readable code form a part of this application.

Some embodiments of the readable storage medium include a floppy disk, a hard disk, a magneto-optical disk, an optical disc (for example, a CD-ROM, a CD-R, a CD-RW, a DVD-ROM, a DVD-RAM, a DVD-RW, and a DVD-RW), a magnetic tape, a nonvolatile memory card, and a ROM. Alternatively, the program code can be downloaded from a server computer or a cloud by a communication network.

According to one or more embodiments, a computer program product is provided. The computer program product includes a computer program, and when the computer program is executed by a processor, the processor is enabled to perform the above-mentioned operations and functions described with reference to FIG. 1 to FIG. 14 in the embodiments of this specification.

A person skilled in the art should understand that variations and modifications can be made to the embodiments disclosed above without departing from the essence of the present invention. Therefore, the protection scope of the present invention shall be subject to the appended claims.

It should be noted that not all steps and units in the above-mentioned processes and system structural diagrams are mandatory, and some steps or units can be ignored according to an actual need. An execution sequence of the steps is not fixed, and can be determined as needed. The apparatus structure described in the above-mentioned embodiments can be a physical structure, or can be a logical structure. In other words, some units can be implemented by the same physical entity, or some units can be implemented by multiple physical entities or implemented jointly by some components in multiple independent devices.

In the above-mentioned embodiments, the hardware units or modules can be implemented by using a mechanical method or an electrical method. For example, a hardware unit, module or processor can include a permanent dedicated circuit or logic (for example, a dedicated processor, FPGA, or ASIC) to complete corresponding operations. The hardware unit or processor can further include programmable logic or a programmable circuit (for example, a general-purpose processor or another programmable processor), so that software can perform temporary settings to complete corresponding operations. Specific implementations (mechanical methods, dedicated permanent circuits, or temporarily disposed circuits) can be determined based on cost and time considerations.

The specific implementations illustrated above with reference to the accompanying drawings describe example embodiments, but do not represent all embodiments that can be implemented or fall within the protection scope of the claims. The term "example" used throughout this specification means "used as an example, an instance, or an illustration", but does not mean "preferred" or "advantageous" over other embodiments. Specific implementations include specific details for the purpose of providing an understanding of the described technologies. However, these technologies can be implemented without these specific details. In some instances, to avoid obscuring the described concepts in the embodiments, well-known structures and apparatuses are shown in the form of a block diagram.

The above-mentioned descriptions of the present disclosure are provided to enable any person of ordinary skill in the art to implement or use the present disclosure. Various modifications made to the present disclosure are apparent to a person of ordinary skill in the art, and the general principles defined in this specification can also be applied to other variants without departing from the protection scope of the present disclosure. Therefore, the present disclosure is not limited to the examples and designs described in this specification, but corresponds to the widest scope of principles and novel features disclosed in this specification.

What is claimed is:

1. A computer-implemented method for querying data, comprising:
    performing a data query in a memory table in response to receiving a data query request initiated by a user;
    initiating in parallel at least one master data block asynchronous input/output (IO) query for a hierarchical storage layer to a database system in response to that a data query result for the memory table does not satisfy a data query condition in the data query request, wherein the database system comprises a memory layer and a nonvolatile data storage medium layer, wherein the nonvolatile data storage medium layer comprises at least one hierarchical storage layer, wherein data is sequentially stored in the memory table at the memory layer and a data storage file at the at least one hierarchical storage layer, and wherein data in the data storage file is stored as at least one master data block;
    after receiving a query response to all master data block asynchronous IO queries, performing data analysis on a master data block obtained through a query, wherein, until a query response to all master data block asynchronous IO queries is received, the master data block obtained through a query is counted and stored without performing data analysis on the master data block; and
    determining a data query result for the data query request based on the data query result for the memory table or a data analysis result of the master data block, and providing the data query result for the data query request for the user.

2. The computer-implemented method of claim 1, wherein:
    the master data block comprises metadata used to record storage location information of a corresponding additional data block in the data storage file; and
    after performing data analysis on a master data block obtained through a query:
        initiating in parallel an additional data block asynchronous IO query for a to-be-queried additional data block to the database system in response to that the data analysis result of the master data block indicates that an additional data block needs to be queried;
        after receiving a query response to all additional data block query requests, performing data analysis on an additional data block obtained through a query; and
    the determining a data query result for the data query request based on the data query result for the memory table or a data analysis result of the master data block, and providing the data query result for the data query request for the user, comprises:
        determining the data query result for the data query request based on the data query result for the memory table, the data analysis result of the master data block, or a data analysis result of the additional data block; and
        providing the data query result for the data query request for the user.

3. The computer-implemented method of claim 2, wherein:
    the initiating in parallel an additional data block asynchronous IO query for a to-be-queried additional data block to the database system in response to that the data analysis result of the master data block indicates that an additional data block needs to be queried, comprises:
        for each to-be-queried additional data block, obtaining, and obtained storage location information, storage location information that is of an additional data block in the data storage file and that is recorded in metadata in a corresponding master data block;
        generating a corresponding additional data block asynchronous IO query request based on the obtained storage location information of the additional data block in the data storage file; and
        sending in parallel all generated additional data block asynchronous IO query requests to the database system.

4. The computer-implemented method of claim 2, wherein an indication indicating that the additional data block needs to be queried is determined based on metadata in an analyzed master data block and the data query condition.

5. The computer-implemented method of claim 1, wherein:
    to-be-stored data is stored in the database system; and
    storing the to-be-stored data in the database system, comprises:
        writing to-be-stored data into the memory table; and
        in response to that the memory table is fully written, performing, layer-by-layer and starting from a top hierarchical storage layer until lower-layer data writing is not triggered, data writing on stored data in the memory table:
            reading, as read stored data, all stored data in a data storage file at a current hierarchical storage layer;
            combining written upper-layer stored data with the read stored data;
            dividing a value corresponding to each key in combined stored data into at least one master data block;
            determining, based on a common hash value and a perfect hash value of a key corresponding to each master data block and as a determined data storage file, a data storage file in which each master data block is located and an offset of each master data block in the data storage file in which each master data block is located, wherein each data storage file corresponds to a common hash value range; and performing data writing on each master data block based on the determined data storage file in which each master data block is located and the offset of each master data block in the data storage file in which each master data block is located.

6. The computer-implemented method of claim 5, wherein:
the initiating in parallel at least one master data block asynchronous IO query for the hierarchical storage layer to the database system in response to that a data query result for the memory table does not satisfy a data query condition in the data query request, comprises:
for each hierarchical storage layer, locating a data storage file at the hierarchical storage layer based on a common hash value of a key of to-be-queried data, and locating storage location information of a master data block in the data storage file based on a perfect hash value of the key;
for each to-be-queried master data block, generating a corresponding master data block asynchronous IO query request based on the storage location information of the master data block in the data storage file at a corresponding hierarchical storage layer; and
sending in parallel all generated master data block asynchronous IO query requests to the database system.

7. The computer-implemented method of claim 5, wherein:
the dividing a value corresponding to each key in combined stored data into at least one master data block, comprises:
dividing the value corresponding to each key in the combined stored data into the at least one master data block and a corresponding additional data block; and
the performing data writing on each master data block based on the determined data storage file in which each master data block is located and an offset of each master data block in the data storage file in which each master data block is located, comprises:
performing data writing on each master data block and a corresponding additional data block based on the determined data storage file in which the master data block is located and an offset of the master data block in the data storage file in which the master data block is located, wherein a written master data block comprises metadata, and the metadata are used to record storage location information of each additional data block of the master data block in the data storage file.

8. The computer-implemented method of claim 1, wherein the determining a data query result based on the data query result for the memory table or a data analysis result of the master data block, comprises:
backfilling the data query result for the memory table or the data analysis result of the master data block into the data query result based on the data query condition.

9. A non-transitory, computer-readable medium storing one or more instructions executable by a computer system to perform one or more operations for querying data, comprising:
performing a data query in a memory table in response to receiving a data query request initiated by a user;
initiating in parallel at least one master data block asynchronous input/output (IO) query for a hierarchical storage layer to a database system in response to that a data query result for the memory table does not satisfy a data query condition in the data query request, wherein the database system comprises a memory layer and a nonvolatile data storage medium layer, wherein the nonvolatile data storage medium layer comprises at least one hierarchical storage layer, wherein data is sequentially stored in the memory table at the memory layer and a data storage file at the at least one hierarchical storage layer, and wherein data in the data storage file is stored as at least one master data block;
after receiving a query response to all master data block asynchronous IO queries, performing data analysis on a master data block obtained through a query, wherein, until a query response to all master data block asynchronous IO queries is received, the master data block obtained through a query is counted and stored without performing data analysis on the master data block; and
determining a data query result for the data query request based on the data query result for the memory table or a data analysis result of the master data block, and providing the data query result for the data query request for the user.

10. The non-transitory, computer-readable medium of claim 9, wherein:
the master data block comprises metadata used to record storage location information of a corresponding additional data block in the data storage file; and
after performing data analysis on a master data block obtained through a query:
initiating in parallel an additional data block asynchronous IO query for a to-be-queried additional data block to the database system in response to that the data analysis result of the master data block indicates that an additional data block needs to be queried;
after receiving a query response to all additional data block query requests, performing data analysis on an additional data block obtained through a query; and
the determining a data query result for the data query request based on the data query result for the memory table or a data analysis result of the master data block, and providing the data query result for the data query request for the user, comprises:
determining the data query result for the data query request based on the data query result for the memory table, the data analysis result of the master data block, or a data analysis result of the additional data block; and
providing the data query result for the data query request for the user.

11. The non-transitory, computer-readable medium of claim 10, wherein:
the initiating in parallel an additional data block asynchronous IO query for a to-be-queried additional data block to the database system in response to that the data analysis result of the master data block indicates that an additional data block needs to be queried, comprises:
for each to-be-queried additional data block, obtaining, and obtained storage location information, storage location information that is of an additional data block in the data storage file and that is recorded in metadata in a corresponding master data block;
generating a corresponding additional data block asynchronous IO query request based on the obtained storage location information of the additional data block in the data storage file; and
sending in parallel all generated additional data block asynchronous IO query requests to the database system.

12. The non-transitory, computer-readable medium of claim 10, wherein an indication indicating that the additional data block needs to be queried is determined based on metadata in an analyzed master data block and the data query condition.

13. The non-transitory, computer-readable medium of claim 9, wherein:
to-be-stored data is stored in the database system; and
storing the to-be-stored data in the database system, comprises:
 writing to-be-stored data into the memory table; and
 in response to that the memory table is fully written, performing, layer-by-layer and starting from a top hierarchical storage layer until lower-layer data writing is not triggered, data writing on stored data in the memory table:
  reading, as read stored data, all stored data in a data storage file at a current hierarchical storage layer;
  combining written upper-layer stored data with the read stored data;
  dividing a value corresponding to each key in combined stored data into at least one master data block;
  determining, based on a common hash value and a perfect hash value of a key corresponding to each master data block and as a determined data storage file, a data storage file in which each master data block is located and an offset of each master data block in the data storage file in which each master data block is located, wherein each data storage file corresponds to a common hash value range; and
  performing data writing on each master data block based on the determined data storage file in which each master data block is located and the offset of each master data block in the data storage file in which each master data block is located.

14. The non-transitory, computer-readable medium of claim 13, wherein:
the initiating in parallel at least one master data block asynchronous IO query for the hierarchical storage layer to the database system in response to that a data query result for the memory table does not satisfy a data query condition in the data query request, comprises:
for each hierarchical storage layer, locating a data storage file at the hierarchical storage layer based on a common hash value of a key of to-be-queried data, and locating storage location information of a master data block in the data storage file based on a perfect hash value of the key;
for each to-be-queried master data block, generating a corresponding master data block asynchronous IO query request based on the storage location information of the master data block in the data storage file at a corresponding hierarchical storage layer; and
sending in parallel all generated master data block asynchronous IO query requests to the database system.

15. The non-transitory, computer-readable medium of claim 13, wherein:
the dividing a value corresponding to each key in combined stored data into at least one master data block, comprises:
 dividing the value corresponding to each key in the combined stored data into the at least one master data block and a corresponding additional data block; and
 the performing data writing on each master data block based on the determined data storage file in which each master data block is located and an offset of each master data block in the data storage file in which each master data block is located, comprises:
  performing data writing on each master data block and a corresponding additional data block based on the determined data storage file in which the master data block is located and an offset of the master data block in the data storage file in which the master data block is located, wherein a written master data block comprises metadata, and the metadata are used to record storage location information of each additional data block of the master data block in the data storage file.

16. The non-transitory, computer-readable medium of claim 9, wherein the determining a data query result based on the data query result for the memory table or a data analysis result of the master data block, comprises:
backfilling the data query result for the memory table or the data analysis result of the master data block into the data query result based on the data query condition.

17. A computer-implemented system for querying data, comprising:
one or more computers; and
one or more computer memory devices interoperably coupled with the one or more computers and having tangible, non-transitory, machine-readable media storing one or more instructions that, when executed by the one or more computers, perform one or more operations, comprising:
 performing a data query in a memory table in response to receiving a data query request initiated by a user;
 initiating in parallel at least one master data block asynchronous input/output (IO) query for a hierarchical storage layer to a database system in response to that a data query result for the memory table does not satisfy a data query condition in the data query request, wherein the database system comprises a memory layer and a nonvolatile data storage medium layer, wherein the nonvolatile data storage medium layer comprises at least one hierarchical storage layer, wherein data is sequentially stored in the memory table at the memory layer and a data storage file at the at least one hierarchical storage layer, and wherein data in the data storage file is stored as at least one master data block;
 after receiving a query response to all master data block asynchronous IO queries, performing data analysis on a master data block obtained through a query, wherein, until a query response to all master data block asynchronous IO queries is received, the master data block obtained through a query is counted and stored without performing data analysis on the master data block; and
 determining a data query result for the data query request based on the data query result for the memory table or a data analysis result of the master data block, and providing the data query result for the data query request for the user.

18. The computer-implemented system of claim 17, wherein:
the master data block comprises metadata used to record storage location information of a corresponding additional data block in the data storage file; and
after performing data analysis on a master data block obtained through a query:
 initiating in parallel an additional data block asynchronous IO query for a to-be-queried additional data block to the database system in response to that the data analysis result of the master data block indicates that an additional data block needs to be queried;

after receiving a query response to all additional data block query requests, performing data analysis on an additional data block obtained through a query; and the determining a data query result for the data query request based on the data query result for the memory table or a data analysis result of the master data block, and providing the data query result for the data query request for the user, comprises:

determining the data query result for the data query request based on the data query result for the memory table, the data analysis result of the master data block, or a data analysis result of the additional data block; and providing the data query result for the data query request for the user.

19. The computer-implemented system of claim 18, wherein:

the initiating in parallel an additional data block asynchronous IO query for a to-be-queried additional data block to the database system in response to that the data analysis result of the master data block indicates that an additional data block needs to be queried, comprises:

for each to-be-queried additional data block, obtaining, and obtained storage location information, storage location information that is of an additional data block in the data storage file and that is recorded in metadata in a corresponding master data block;

generating a corresponding additional data block asynchronous IO query request based on the obtained storage location information of the additional data block in the data storage file; and sending in parallel all generated additional data block asynchronous IO query requests to the database system.

20. The computer-implemented system of claim 18, wherein an indication indicating that the additional data block needs to be queried is determined based on metadata in an analyzed master data block and the data query condition.

* * * * *